Oct. 25, 1932. C. W. KIESEL 1,884,728
BALOMETER
Filed Sept. 17, 1930 2 Sheets-Sheet 1

WITNESSES

INVENTOR
Charles W. Kiesel,
BY
ATTORNEY

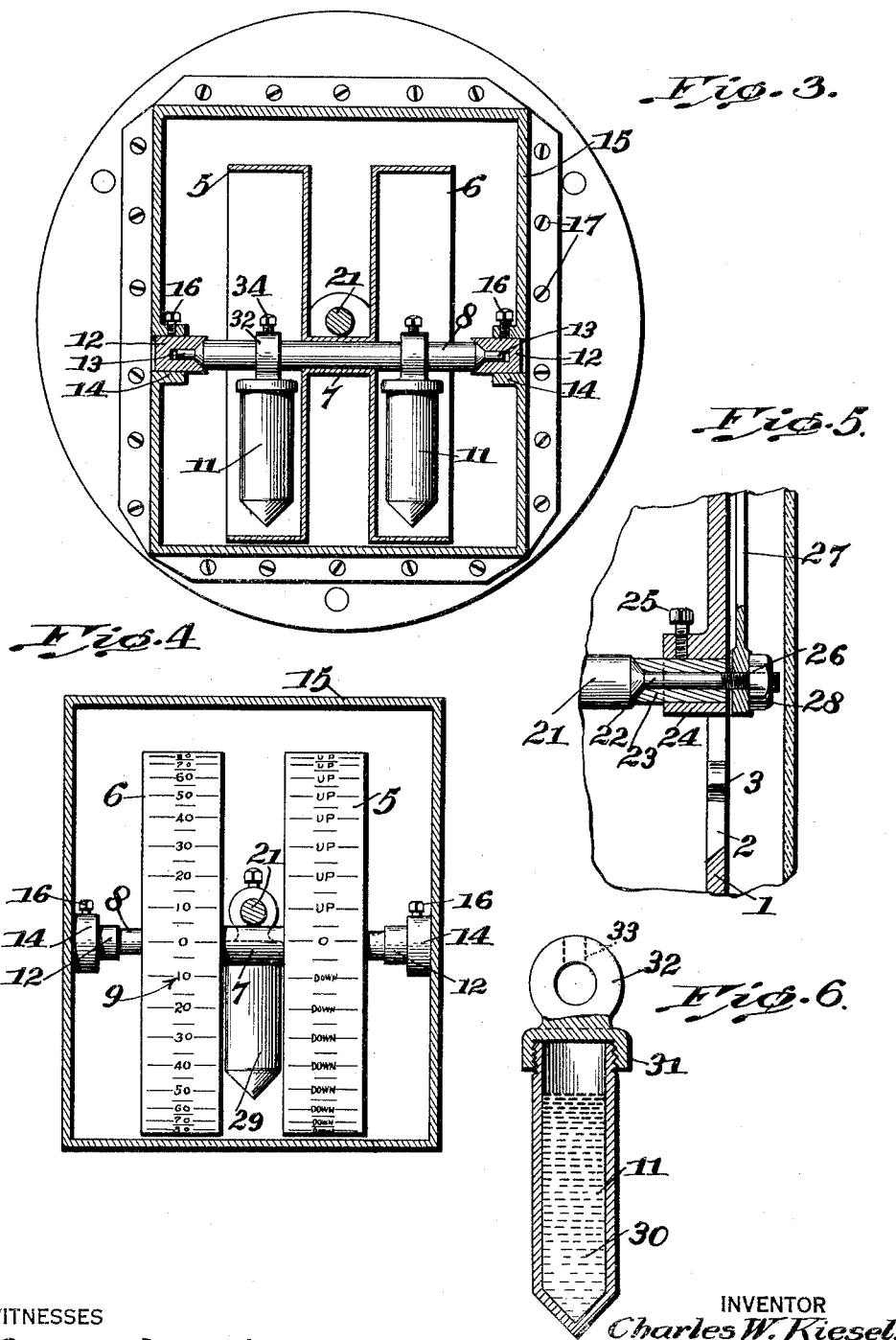

Patented Oct. 25, 1932

1,884,728

UNITED STATES PATENT OFFICE

CHARLES W. KIESEL, OF HONOLULU, TERRITORY OF HAWAII

BALOMETER

Application filed September 17, 1930. Serial No. 482,591.

This invention relates to improvements in accessories for aircraft, and it consists of the constructions, combinations and arrangements herein described and claimed.

An object of the invention is to provide an instrument of compact form for the purpose of indicating to the aviator any one of all possible positions of the aircraft regardless of whether the latter is flying during the day or at night or in the clouds.

Figure 1:
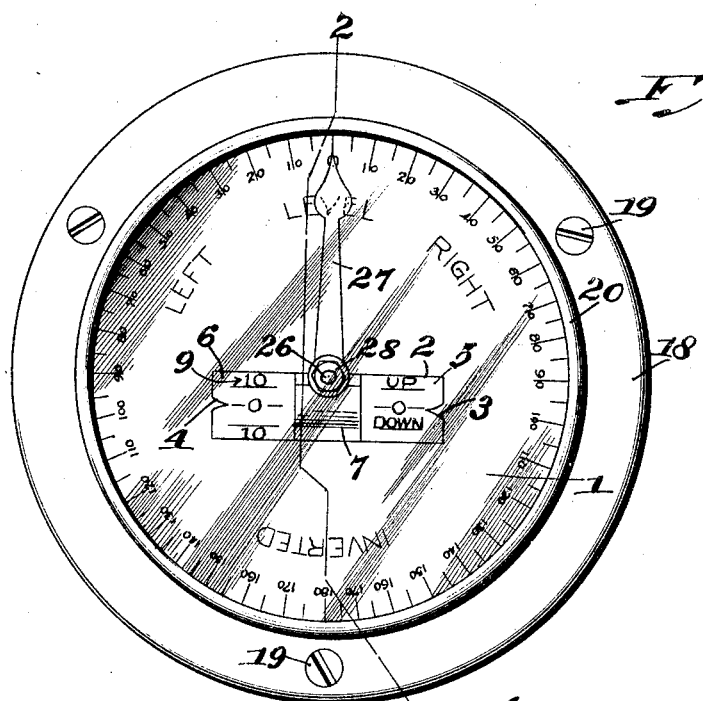
Figure 2:
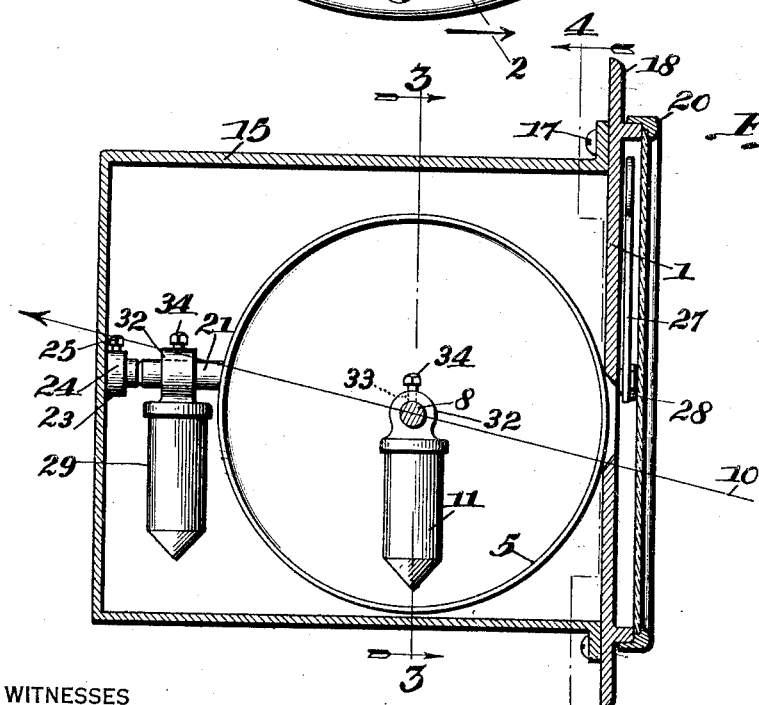

Other objects and advantages will appear in the following specification, reference being had to the accompanying drawings, in which Figure 1 is a face view of the improved balometer, Figure 2 is a vertical section taken on the line 2—2 of Fig. 1, Figure 3 is a cross section taken on the line 3—3 of Fig. 2, Figure 4 is a cross section taken on the line 4—4 of Fig. 2, Figure 5 is a detailed section illustrating one of the bearings and the mode of attaching the indicator hand, and Figure 6 is a detail sectional view of one of the links.

This invention is an improvement on the balometer disclosed in an application filed by Charles W. Kiesel, March 21, 1930, Serial No. 437,886. That balometer is what might be known as a dual vision port design, in other words, includes separate sight openings at which indications of the lateral and longitudinal deviations of the aircraft are made visible.

According to the present arrangement the dial 1 of the instrument is provided with a single sight opening whereat indications of the longitudinal position of the aircraft are made to appear. The side edges of the opening 2 are formed with pointers 3, 4, the first working in conjunction with a cylinder 5 (Fig. 4), the second working in conjunction with a cylinder 6.

These cylinders are connected by a common hub 7 (Fig. 3) which is appropriately secured to a transverse shaft 8. In other words, assuming the balometer to be in position on the instrument board of the aircraft in front of the aviator as in Fig. 1, the shaft 8 will be found extending crosswise or transversely of the instrument board, and consequently of the aircraft itself.

While the latter is on an even keel or perfectly horizontal, the pointers 3, 4 (Fig. 1) will indicate zero. The zero designation "0" is one of a plurality of indicia on the periphery of each of the cylinders 5, 6. One-half of the indicia on the cylinder 5 reads "up" while the other half reads "down" (Fig. 4). These terms are directly opposite to degree graduations 9 on the companion cylinder 6 so that when the aircraft deviates either upwardly or downwardly from the foregoing horizontal position the number of degrees of deviation will be indicated as will also the direction in which the aviator must make an adjustment in order to arrive at the former horizontal position.

Assume, for example, that the aircraft should incline upwardly in the longitudinal direction as denoted by the arrow 10 in Fig. 2. There is a consequent displacement of the dial 1 over the cylinders 5, 6 in the downward direction so that the pointers 4 instead of pointing to zero, will point to perhaps "10" or "20". This shows that there is a 10 or 20 degree upward inclination of the aircraft from the horizontal. At the same time the pointer 3 will indicate "down", which means that the aviator must make his adjustments in the downward direction until the original level position of the aircraft is re-established. The same principle of operation obtain in case the aircraft should incline downwardly in the longitudinal direction.

The shaft 8 carries a pair of weights or plumb bobs 11 (Fig. 3). These are housed by the cylinders 5, 6 making a very compact arrangement. The two plumb bobs are preferable because they afford a requisite amount of weight that insures keeping the cylinders 5, 6 perfectly still as far as rotation is concerned.

Bearings 12 (Fig. 3) support the reduced ends 13 of the shaft 8. These ends will be highly polished or, if desired, augmented by anti-friction bearings so that the least possible resistance will occur. The bearings 12 are set in hubs 14 of the casing 15 by screws 16.

The casing is fastened on back of the dial 1 as at 17 (Figs. 2 and 3). The peripheral flange 18 of the dial is fastened to the instrument board (not shown) by means of screws 19 (Fig. 1). Since the plumb bobs 11 always tend to remain perfectly erect it follows that the aircraft will revolve in respect to the shaft 8 so that the dial 1 moves along the peripheries of the cylinders 5, 6, rather than the cylinders revolve behind the dial 1 in respect to the opening 2.

A similar principle of construction and operation occurs in the instance of the lateral deviation of the aircraft. In banking the latter to make a right turn, for example, there will be an indication of how much and in what direction the aircraft will have to be readjusted toward the left in order to resume an even keel. To these ends that part of the dial 1 immediately to the inside of the bezel (Figs. 1 and 2) is graduated in the degrees of a circle beginning with zero at the top (Fig. 1), running therefrom both right and left and terminating at "180" at the bottom. The terms "Level", "Inverted", "Right" and "Left" appear on the face of the dial as shown.

A shaft 21 extends longitudinally of the casing 15 and assumes a position between the spaced cylinders 5, 6 immediately above the hub 7. The reduced ends 22 (Fig. 5) of this shaft are mounted in bearings 23 which are set in position in hubs 24 by screws 25 as in the instance of shaft 8.

The threaded extension 26 (Fig. 5) of the said reduced end 22 carries a hand 27 which is locked in place by a nut 28. A single plumb bob 29 is secured to the shaft 21 (Fig. 2). This tends to keep the hand 27 perfectly erect. As the aircraft deviates laterally from the horizontal position the effect will be a rotation of the casing 15 and consequently of the dial 1 in reference to the hand 27 so that the latter is made to indicate the amount of the deviation.

Each of the plum bobs, taking the plumb bob 11 for example (Fig. 6), comprises a tube partially filled with mercury 30. The tube is closed at the bottom and open at the top. The open end is threaded to receive a cap 31 which has a perforated boss 32 to receive the particular shaft with which it is intended to be connected. This boss has a tapped hole 33 to receive a set screw 34.

Should the aviator wish to make a turn to the right there will be a rotation of the aircraft to the right in reference to the longitudinal shaft 21. The dial 1 will revolve to the right in respect to the hand 27. The amount of inclination will be indicated by the graduations. The word "Left" will advance toward the indicator hand thus denoting to the aviator that a readjustment must be made toward the left to the extent of the number of degrees indicated by the hand before an even keel of the aircraft will be established.

Suppose that the aircraft should become inverted or nearly so. There has been instances where aviators have totally lost their sense of direction and position while flying through clouded atmosphere and have found that they were flying upside down when departing from the clouded area where they could establish a sense of relationship to the earth. Under a condition such as named the terms "Inverted" and "Left" would be nearest the indicator hand 27 again denoting the necessity of a correction to the left in order to right the aircraft.

While the construction and arrangement of the improved balometer is that of a generally preferred form, obvious modifications and changes may be made without departing from the spirit of the invention or the scope of the claim.

What I claim is:

An instrument of the character described comprising a casing, a dial comprising part of the casing, said dial having a sight opening with confronting pointers and there being peripheral graduations on one face of the dial, a pair of crossed shafts journaled in the casing, a hand carried by one of the shafts being situated in front of the dial and operative in respect to the graduations, a pair of calibrated indicators on the other shaft being visible through the opening and cooperating with the pointers, and means on each of the respective shafts tending to maintain them in a constant position and producing various readings of the graduations and calibrations in respect to the hand and said indicators upon movements of the casing in different directions.

CHARLES W. KIESEL.